Jan. 23, 1934.  E. W. BEARDSLEY  1,944,162
DEVICE FOR PURGING CONDUITS OF CARBON OR THE LIKE
Filed Nov. 12, 1929  2 Sheets-Sheet 1
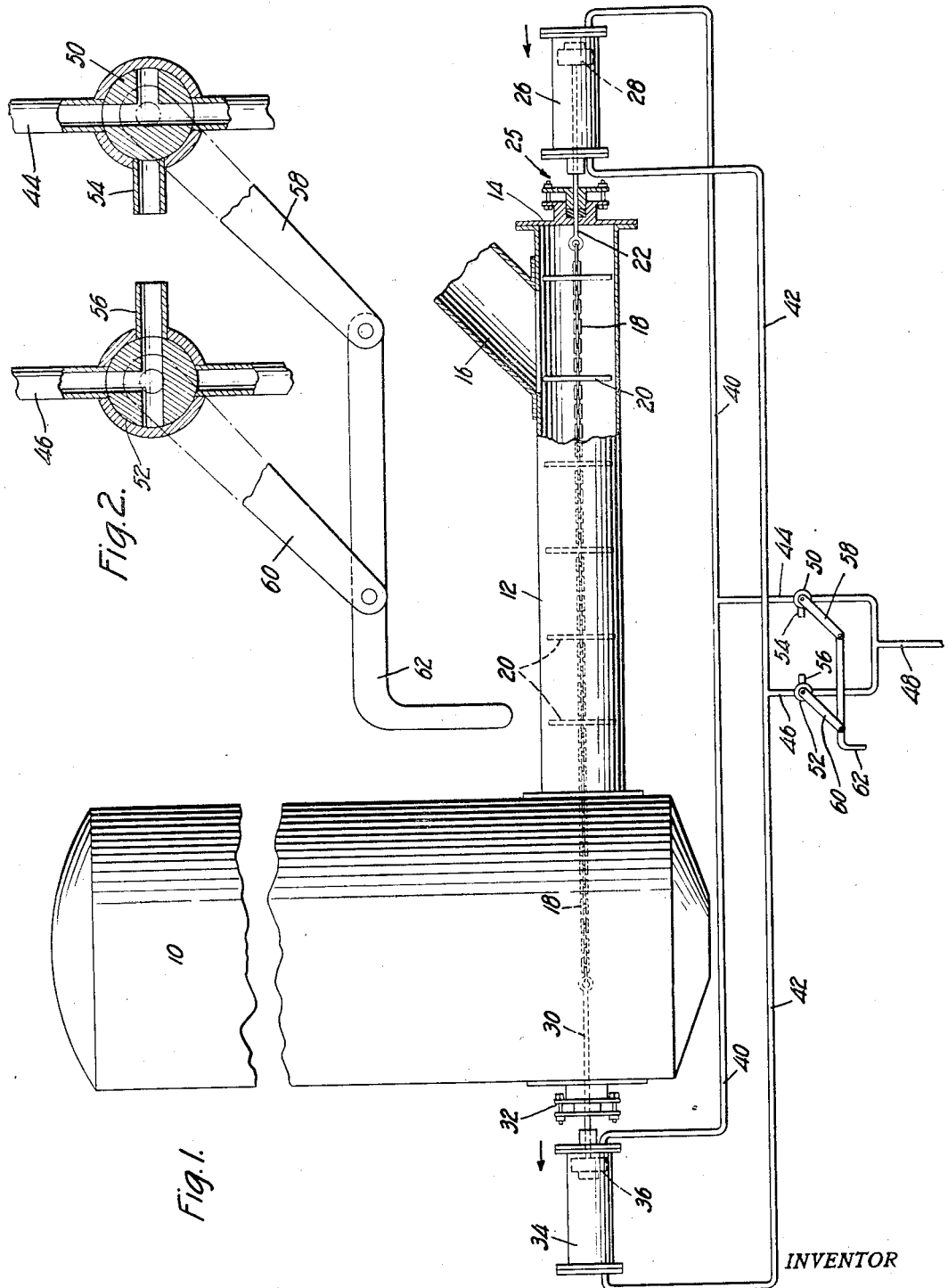
INVENTOR
Edwin W. Beardsley.
BY
ATTORNEY

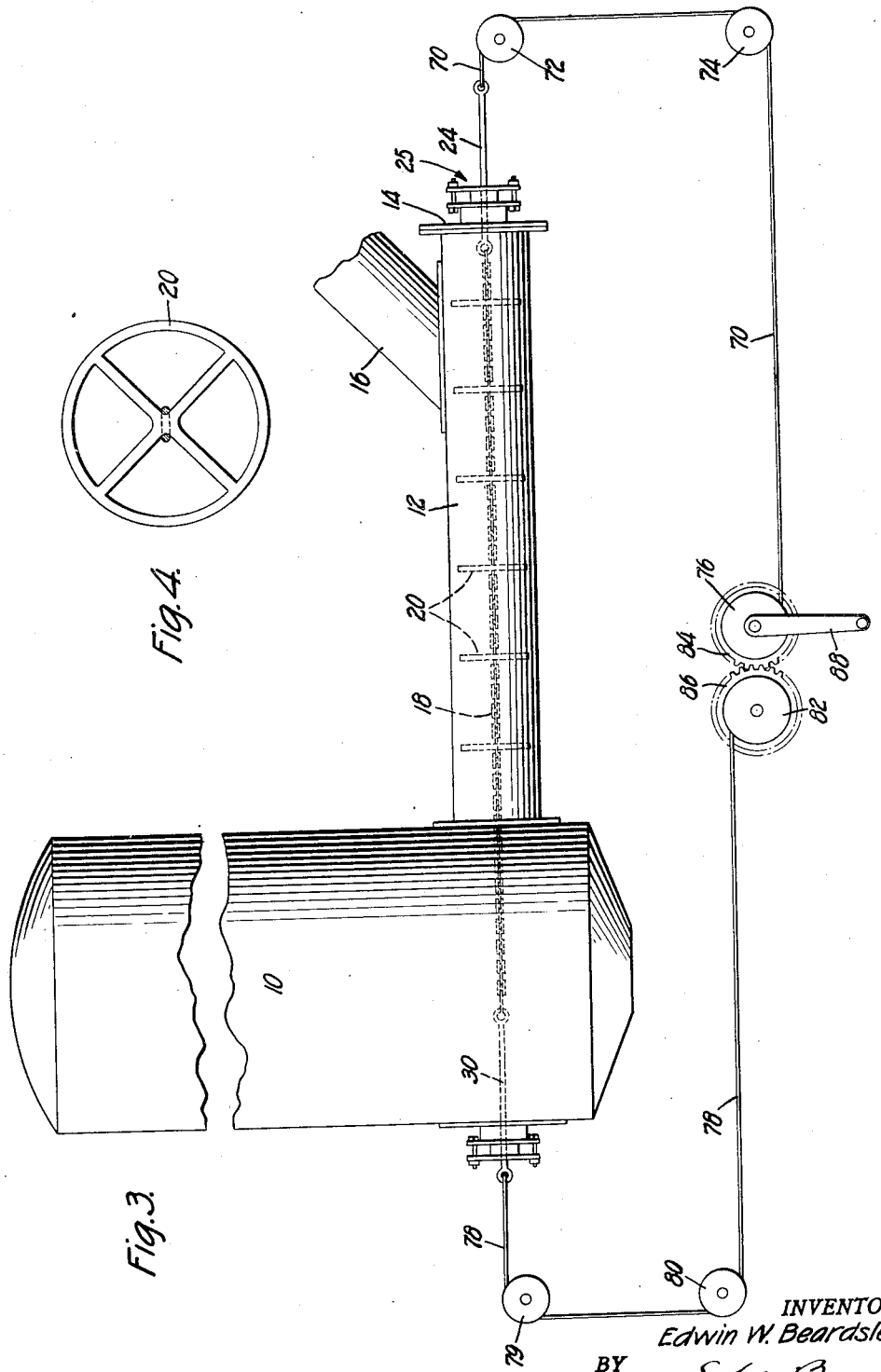

Patented Jan. 23, 1934

1,944,162

UNITED STATES PATENT OFFICE 1,944,162

DEVICE FOR PURGING CONDUITS OF CARBON OR THE LIKE

Edwin W. Beardsley, Texas City, Tex., assignor to Petroleum Conversion Corporation, New York, N. Y., a corporation of Delaware Application November 12, 1929
Serial No. 406,609

1 Claim. (Cl. 196—122)

My present invention relates to improvements in devices for purging conduits or the like from carbon. In the system of oil conversion to which my invention has particular reference, cracking of the oil is brought about in the vapor phase by the agency of heated heat-carrier gas. The mixture of converted products and carrier gas is then conducted from the chamber in which the reaction takes place through a suitable conduit into a chamber in which the suspended carbon is removed. In the conduit connecting the conversion chamber and the carbon removing apparatus there is accordingly likely to be considerable precipitation of carbon which, unless removed from time to time, will seriously plug up this conduit. I have discovered that because of the light and flaky texture of the carbon particles, those that settle out may be caused to again become suspended in the gaseous stream of products upon being suitably agitated. On the other hand, if allowed to accumulate, the carbon particles have a tendency to pack because of their high velocity and to form a hard homogeneous, sometimes granular, mass.

It is accordingly an object of my invention to provide in the conduit mentioned means for agitating the carbon which has settled, or is in the act of settling out; a further object being to provide semi-automatic means for moving the agitating device back and forth through the conduit. In the accompanying drawings I have illustrated two embodiments of my invention, one in which the agitating device is fluid operated, the other in which the device is manually operated. A feature which is common to both embodiments is that of having a common operating means for accomplishing both forward and backward movements of the agitating device.

Accordingly, in Figure 1 I have shown a set-up of a conversion chamber, a conduit leading therefrom, a scraping or agitating device in such conduit, and fluid means for operating same; in Figure 2 I have shown in detail means for operating the fluid valves; in Figure 3, manual means for operating the agitating device; and in Figure 4 I have shown a detailed view of the scraping or agitating element.

Referring now to Figure 1, 10 denotes a conversion chamber into which are introduced through a conduit, not shown, a mixture of oil vapor and heat carrier gas. The mixture leaves chamber 10 through a conduit 12 which preferably has a dead end 14 and a branch conduit 16 leading to a further piece of apparatus not shown, usually a carbon removing device, such branch conduit being located adjacent the dead end 14. The scraping devices consist preferably of a chain 18 having attached thereto at intervals scraping elements 20 which as shown in greater detail in Figure 4 offer comparatively little resistance to the passage of a gaseous stream through the conduit. Passing through the dead end 14 is a rod 22 which connects one end of the chain 18, and passes through a stuffing box 25 to a cylinder 26. In this cylinder is a piston 28 connected to said rod. Preferably, although not necessarily, rod 30 connecting chain 18 at the other end thereof extends through reaction chamber 10 and then through a stuffing box 32 fixed to said chamber, a cylinder 34 and a piston 36, all similar to those of the right hand end of the apparatus.

Fluid is introduced through the respective right hand ends of cylinders 26 and 34 by means of a pipe 40 and through the left hand ends of said cylinders by means of a pipe 42. Means are preferably provided for operating said cylinders in unison, and comprise branches 44 and 46 leading to a common source 48 of fluid under pressure. Valves 50, 52 are located respectively in branches 44 and 46, such valves having exhaust nipples 54, 56. Valves 50, 52 are of the three-way type as seen in Figure 2 and are joined by parallel links 58 and 60 joining a common handle 62.

As will be seen from Figure 2, when the handle 62 is pushed to the left, fluid under pressure will be admitted through branch 44 from source 48 and thence to the right hand ends respectively of cylinders 26 and 34; also branch 46 connecting pipe 42 will be open to the exhaust nipple 56. The pistons 28 and 36 are therefore moved to the left and thereby move the chain and associated elements to the left. When, however, the handle 62 is pushed to the right, the connection will be reversed whereby fluid under pressure will be admitted to pipe 42 and pipe 40 will be connected to the exhaust. The scrapers will therefore move back to the right.

Instead of having the chain 18 and rod 30 pass through the reaction chamber, they may be brought through a dead end similar to that at the right of Figure 1 and a branch conduit provided to connect the conduit with the reaction chamber.

In Figure 3 I have shown the same arrangement except that manual means is employed for moving the scrapers. This consists of a flexible cable 70 attached to rod 24, such cable passing over pulleys 72, 74 and thence to a winding drum 76. Similarly, a cable 78 is attached to rod 30 and passes over pulleys 79 and 80 and thence to a winding drum 82. Preferably each of said drums 76 and 82 is provided with gears 84 and 86, respectively, and one of said drums, as for example 76, with a crank 88. By means of this crank, when the crank is turned clockwise, for example, the cable 70 will be wound upon drum 76 while cable 78 will be paid out by drum 82. This will cause the chain 18 and scrapers 20 carried thereby to move to the right. Similarly when the crank is moved in the reverse direction or counter-clockwise the scrapers 20 will be moved to the left.

It will thus be seen that comparatively simple and efficient means are provided for agitating the carbon deposit in the conduit whereby the latter will be kept free of objectionable deposit of this substance. I wish it understood, however, that various changes may be made in the devices shown without departing from my invention nor the scope of the appended claim.

I claim:

In an apparatus for preventing the deposition of carbon from a gaseous stream containing same in suspension, in combination with a substantially horizontal conduit through which said stream is passed, agitating elements therein of a size nearly equal to the cross section of said conduit but offering only slight resistance to the flow of gases through the conduit, said elements also being disposed with reference to the conduit so as to be operative in either direction of movement lengthwise of the conduit, a flexible member connecting said agitating elements and means operating upon the ends of said member to alternately pull same first in one direction of the conduit and then in the other.

EDWIN W. BEARDSLEY.